United States Patent
Won et al.

(10) Patent No.: US 7,778,534 B2
(45) Date of Patent: Aug. 17, 2010

(54) METHOD AND APPARATUS OF CORRECTING GEOMETRY OF AN IMAGE

(75) Inventors: Joong-Sun Won, Seoul (KR); Hyung-Sup Jung, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 201 days.

(21) Appl. No.: 11/965,099

(22) Filed: Dec. 27, 2007

(65) Prior Publication Data

US 2008/0123990 A1   May 29, 2008

Related U.S. Application Data

(63) Continuation of application No. PCT/KR2006/003301, filed on Aug. 23, 2006.

(30) Foreign Application Priority Data

Mar. 23, 2006   (KR) .................... 10-2006-0026655

(51) Int. Cl.
*G03B 39/00*   (2006.01)
(52) U.S. Cl. ......................... 396/7; 348/147
(58) Field of Classification Search .............. 396/7; 348/144, 147
See application file for complete search history.

(56) References Cited

U.S. PATENT DOCUMENTS

| 2003/0044085 A1* | 3/2003 | Dial et al. ................ 382/293 |
| 2003/0179950 A1* | 9/2003 | Komura et al. ............ 382/275 |
| 2004/0120595 A1* | 6/2004 | Choi et al. ................ 382/254 |

\* cited by examiner

*Primary Examiner*—W. B. Perkey
*Assistant Examiner*—Noam Reisner

(57) ABSTRACT

The present invention relates to a method and apparatus that obtain error correction data by adjusting the LOS vector of a sensor, and assign precise ground coordinates to respective image coordinates of an image using the error correction data and auxiliary data for the image.

In the method of correcting geometry of an image using a LOS vector adjustment model of the present invention, an image, obtained by photographing a ground surface, and auxiliary data for the image, are acquired. Ground coordinates for a ground control point, and image coordinates of the image matching the ground coordinates are acquired. A LOS vector of a sensor of a photographing device is adjusted, thus obtaining error correction data. The auxiliary data and the error correction data are applied to LOS vector adjustment models, and ground coordinates are assigned to respective image coordinates of the image, thus performing exterior orientation.

6 Claims, 3 Drawing Sheets

METHOD AND APPARATUS OF CORRECTING GEOMETRY OF AN IMAGE

CROSS REFERENCE TO RELATED APPLICATIONS

This application is a continuation application of International Application No. PCT/KR2006/003301, filed on Aug. 23, 2006, which claims priority to Korean Patent Application No. 10-2006-0026655, filed on Mar. 23, 2006. These applications are hereby incorporated herein by reference in their entireties.

TECHNICAL FIELD

The present invention relates, in general, to a method and apparatus for correcting distortion of an image, taken to investigate the characteristics of a ground surface and, more particularly, to a method and apparatus that can obtain error correction data by adjusting the LOS vector of a sensor, and can assign precise ground coordinates to respective image coordinates of an image using the error correction data and auxiliary data for the image.

BACKGROUND ART

Currently, an image obtained by photographing a ground surface is mainly captured using both a camera and a sensor installed in an airplane or a satellite located at a certain altitude above the ground surface. An airplane has a relatively low altitude of several hundreds of meters to several kilometers, but has relatively unstable velocity and attitude, compared to a satellite. In contrast, a satellite is a photographing device, moving outside the atmosphere, and has a very high altitude of several hundreds of kilometers, but has relatively stable velocity and attitude, and moves along a defined elliptical orbit. Further, an aerial photograph obtained by an airplane is an image having a very high resolution, and is mainly used to produce a topographic map, an image map, digital terrain data, etc., having a small or intermediate scale. Satellites have recently become able to take high resolution images, but such images are mainly used to manufacture objects related to maps, such as a topographic map, an image map, digital terrain data, etc., having an intermediate or large scale due to their relatively low resolution. Satellites include Satellites Pour l' Observation de la Terre (SPOT), Indian Remote Sensing Satellite (IRS), Advanced Land Observing Satellite (ALOS), Land Remote-sensing Satellite (LANDSAT), and commercial earth observation satellites (IKONOS and QUICKBIRD), and have been used in various application fields, such as detection in variation related to the observation of a ground surface, or forest fire monitoring.

The image of the ground surface, taken using a photographing device, such as an airplane or a satellite, is not immediately utilized for military or industrial purposes. The reason for this is that the image of the ground surface is distorted due to the characteristics of the photographing method.

Therefore, such distortion is corrected, and a precise orthoimage, digital topographic map, three-dimensional image, etc. are produced on the basis of a corrected image and are utilized for military or industrial purposes.

In this case, the correction of distortion of an image means an operation for assigning precise and actual ground coordinates on the ground to respective coordinates on the image.

A typical method of correcting the distortion of an image (geometric correction) involves the use of a sensor model. As shown in FIG. 1, the sensor model is a formula derived from the relationship between the position of a photographing device $\vec{S}$ and the position of a ground control point $\vec{P}$ on the basis of the center of the earth, and is a function of image coordinates $(i, j)$ and ground coordinates $(P_x, P_y, P_z)$. In order to assign ground coordinates using a sensor model, auxiliary data, such as the position, velocity, attitude, and photographing angle of a photographing device, in addition to the image coordinates, is required. Such auxiliary data is provided by the photographing device, together with the image.

However, there is a problem in that such auxiliary data is not accurate. As shown in FIG. 2, there are errors between the photographing position $(S_c)$ and the photographing angle of the actual photographing device, and the photographing position $(S)$ and the photographing angle $(\vec{u})$ according to the auxiliary data. Further, although not shown in the drawing, there is an error between the actual attitude of the photographing device and the attitude according to auxiliary data.

As shown in FIG. 2, due to such errors, the position on the ground surface $P_c$ actually taken by the photographing device and the position on the ground surface $P$ obtained by the sensor model differ from each other.

Therefore, a method of revising a sensor model has been proposed to minimize errors in the ground coordinates on the ground surface caused by inaccurate auxiliary data.

Conventional methods of revising a sensor model, proposed in the prior art, performs revision so that either or both of the position and the attitude of a photographing device, according to auxiliary data, approach those of the actual photographing device.

A representative conventional method is disclosed in Korean Patent Appln. No. 10-2005-51358 entitled "method of Correcting Geometry of a Linearly Scanned Image Using Photographing Device Rotation Model". However, currently, the relatively accurate photographing position, photographing velocity and photographing attitude of a photographing device can be detected using systems such as a Global Positioning System (GPS) or Doppler Orbitography and Radiopositioning Integrated by Satellite (DORIS). That is, because of such accurate information, if a sensor model is revised by adjusting the position or attitude of a photographing device, errors in ground coordinates may be increased instead. Therefore, it is required to more easily and precisely correct the geometric distortion of an image, obtained by photographing the ground surface, by maximally utilizing such accurate information.

DISCLOSURE OF INVENTION

Technical Problem

Accordingly, the present invention has been made keeping in mind the above problems, and an object of the present invention is to provide a method and apparatus that enable more precise geometric correction using a LOS vector adjustment model, which has been established by adjusting the photographing angles (LOS vector) of the sensor of a photographing device, and that can reduce the time and cost required for geometric correction.

Technical Solution

In order to accomplish the above object, the present invention provides a method of correcting geometry of an image through adjustment of a Line-Of-Sight (LOS) vector, comprising the steps of (a) acquiring an image, obtained by photographing a ground surface, and auxiliary data for the image; (b) acquiring ground coordinates for a ground control point, and image coordinates of the image matching the ground coordinates; (c) adjusting a LOS vector of a sensor of a photographing device for photographing the image using the auxiliary data acquired at step (a), and the ground coordinates and the image coordinates acquired at step (b), thus obtaining error correction data; and (d) applying the auxiliary data acquired at step (a) and the error correction data obtained at step (c) to LOS vector adjustment models, and assigning ground coordinates to respective image coordinates of the image, thus performing exterior orientation for correcting distortion of the image.

Further, the present invention provides an apparatus for correcting geometry of an image through adjustment of a LOS vector, comprising an image information extraction unit for extracting information about a position, velocity or attitude of a photographing device, and a LOS vector of a sensor, from auxiliary data for an image obtained by photographing a ground surface; a ground control point extraction unit for receiving and storing ground coordinates for a ground control point and image coordinates matching the ground coordinates; an error correction data extraction unit for receiving data from the image information extraction unit and the ground control point extraction unit, and then generating error correction data through adjustment of the LOS vector of the sensor; and an exterior orientation calculation unit for receiving data from the image information extraction unit and the error correction data extraction unit and applying the data to LOS vector adjustment models, thus calculating ground coordinates corresponding to respective image coordinates of the image.

Advantageous Effects

As described above, the present invention can simplify a calculation procedure for extracting ground coordinates, thus reducing the cost and time required for geometric correction, and remarkably increasing the precision of extracted ground coordinates. Accordingly, the present invention is advantageous in that a working process related to the production of an orthoimage, an image map, a digital topographic map, or digital terrain data can be simplified, thus working time can be reduced.

DESCRIPTION OF REFERENCE CHARACTERS OF IMPORTANT PARTS

10: image information extraction unit
20: ground control point extraction unit
30: error correction data extraction unit
40: sensor model calculation unit
50: exterior orientation calculation unit

BEST MODE

Figure 2:
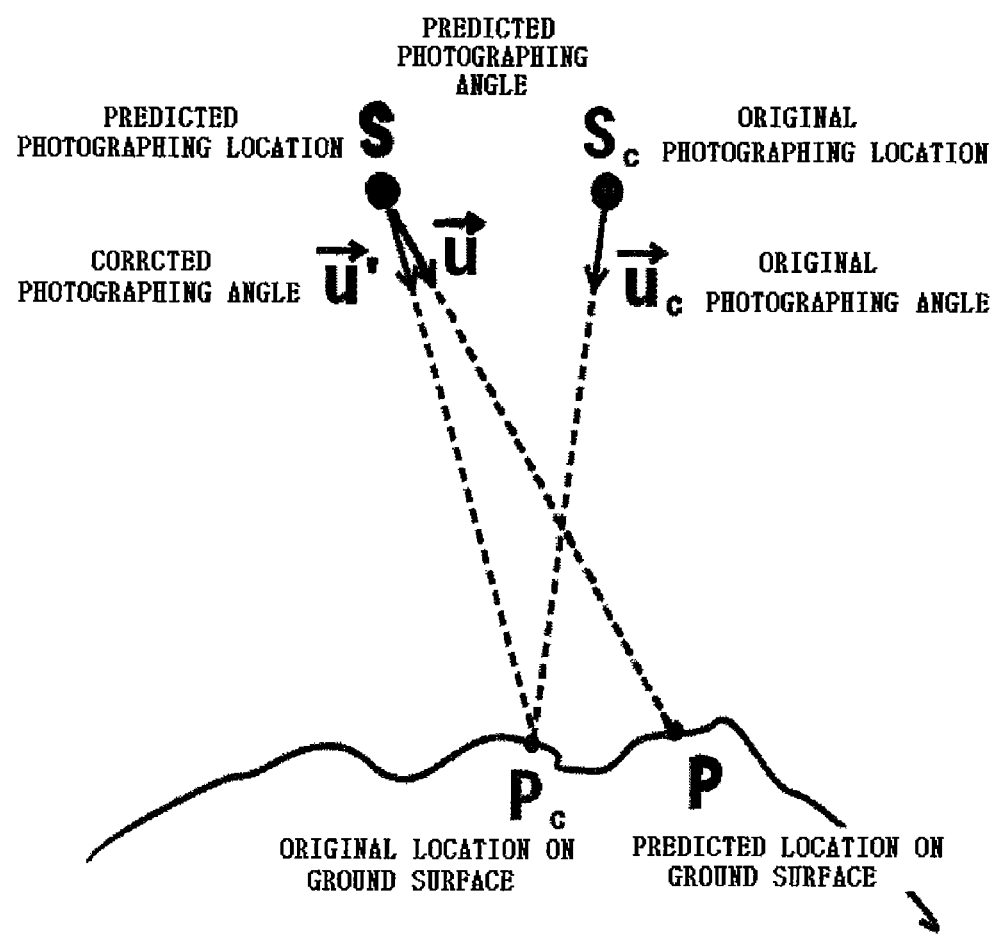
FIG. 2 is a view showing a geometric example of the adjustment of a LOS vector.

As shown in FIG. 2, the present invention adjusts the photographing angles of a sensor (Line-Of-Sight [LOS] vector) among auxiliary data for an image, thus minimizing an error between a position on a ground surface $P_c$, taken by an actual photographing device, and a position on the ground surface, obtained when auxiliary data, including the adjusted photographing angle $\vec{u}$, is applied to LOS vector adjustment models.

First, LOS vector adjustment models, established in the present invention, are described.

Figure 1:
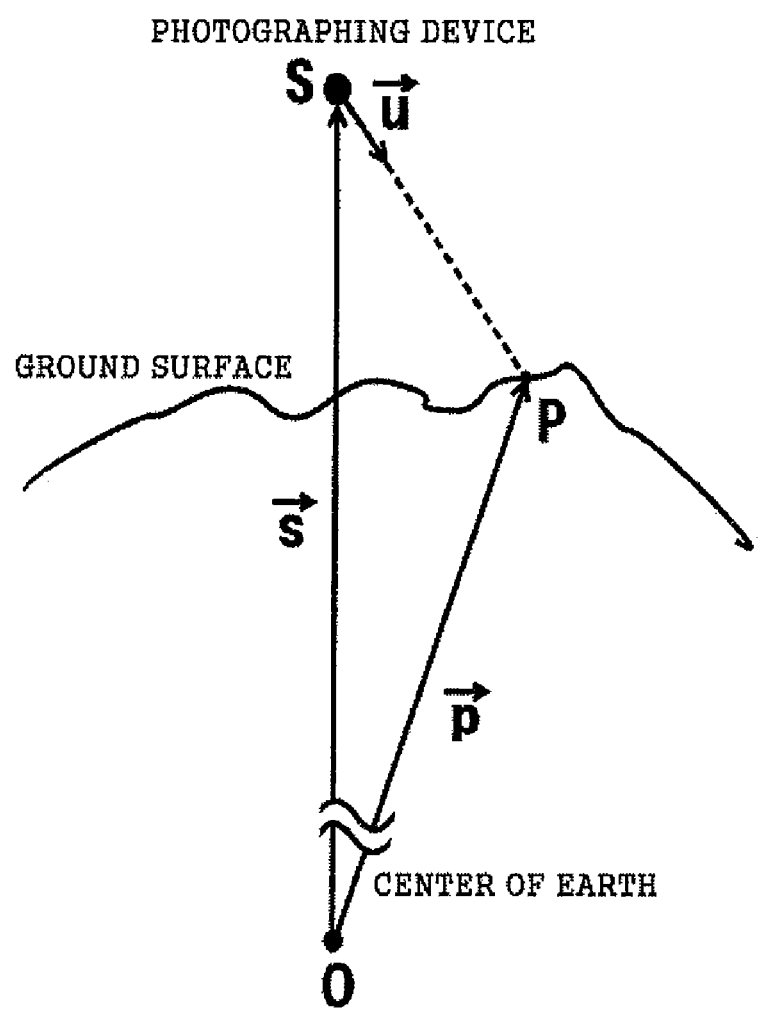
FIG. 1 is a view showing a geometric example of a photographing device and the geometry of a ground surface.

As shown in FIG. 1, the device for photographing the ground surface has a LOS vector $\vec{u}$ directed from the position of the photographing device S, and photographs a position P on the ground surface. If the position of the photographing device from the center of the earth is represented by a vector $\vec{S}$, and the position on the ground surface from the center of the earth is represented by a vector $\vec{P}$, the following Equation is obtained.

$$\vec{P} - \vec{S} = \mu \cdot \vec{u} \qquad \text{[Equation 1]}$$

In this case, $\mu$ is a parameter. However, the values of the vectors $\vec{P}$ and $\vec{S}$, well known in the art, are represented by an Earth-Centered Earth-Fixed Coordinate System (ECEF) or an Earth-Centered Inertia Coordinate System (ECI), and the value of the vector $\vec{u}$ is represented by an Attitude Coordinate System (ACS). Since the three vectors are based on different coordinate systems, the different coordinate systems must be adjusted to the same coordinate system. In order to adjust the different coordinate systems to a local orbital coordinate system, an attitude coordinate rotation matrix for converting the attitude coordinate system into the local orbital coordinate system, and a position coordinate rotation matrix for converting the local orbital coordinate system into the earth-centered earth-fixed coordinate system, are used. The attitude coordinate rotation matrix and the position coordinate rotation matrix are given in the following Equations 2 and 3. If the above Equation 1 is represented again using Equations 2 and 3, the following Equation 4 is obtained.

$$M = \begin{bmatrix} \dfrac{\vec{S} \times (\vec{V} \times \vec{S})}{|\vec{S} \times (\vec{V} \times \vec{S})|} \\ \dfrac{\vec{V} \times \vec{S}}{|\vec{V} \times \vec{S}|} \\ \dfrac{\vec{S}}{|\vec{S}|} \end{bmatrix} \qquad \text{[Equation 2-1, for airplane]}$$

$$M = \begin{bmatrix} \cos\Omega & -\sin\Omega & 0 \\ \sin\Omega & \cos\Omega & 0 \\ 0 & 0 & 1 \end{bmatrix} \cdot \qquad \text{[Equation 2-2, for satellite]}$$

$$\begin{bmatrix} 1 & 0 & 0 \\ 0 & \cos I & -\sin I \\ 0 & \sin I & \cos I \end{bmatrix} \cdot \begin{bmatrix} -\sin W & 0 & \cos W \\ \cos W & 0 & \sin W \\ 0 & 0 & 1 \end{bmatrix}$$

$$A = \begin{bmatrix} \cos\kappa & -\sin\kappa & 0 \\ \sin\kappa & \cos\kappa & 0 \\ 0 & 0 & 1 \end{bmatrix} \cdot \qquad \text{[Equation 3]}$$

$$\begin{bmatrix} \cos\varphi & 0 & \sin\varphi \\ 0 & 1 & 0 \\ -\sin\varphi & 0 & \cos\varphi \end{bmatrix} \cdot \begin{bmatrix} 1 & 0 & 0 \\ 0 & \cos\omega & \sin\omega \\ 0 & \sin\omega & \cos\omega \end{bmatrix}$$

In this case, $\omega$ is a roll angle, $\phi$ is a pitch angle, $\chi$ is a yaw angle, $\vec{S}$ is the position vector of the photographing device, $\vec{V}$ is the velocity vector of the photographing device, is the longitude of an ascending node, is the inclination of an orbit, and is the argument of latitude of a satellite, which is the Kepler element.

$$M^{-1} \cdot \begin{bmatrix} P_x \\ P_y \\ P_z \end{bmatrix} - \begin{bmatrix} 0 \\ 0 \\ \rho \end{bmatrix} = \mu A \cdot \begin{bmatrix} u_x \\ u_y \\ u_z \end{bmatrix} \quad \text{[Equation 4]}$$

In this case $P_x$, $P_y$, $P_z$ and $u_x$, $u_y$, $u_z$ are elements of $\vec{P}$ and $\vec{u}$, respectively, and P is the distance from the center of the earth to the photographing device, and is identical to $|\vec{S}|$. Further, x, y and z are directional components, with z indicating the direction from the center of the earth to the photographing device, x indicating the movement direction of the photographing device, and y indicating the direction perpendicular to x and z directions according to the Right Hand Rule.

If the coordinate transformation matrix is removed from the right term in Equation 4, and properties indicating that $M^{-1}=M^T$ and $A^{-1}=A^T$ are used, Equation 4 can be represented again by the following Equation.

$$(M \cdot A)^T \cdot \begin{bmatrix} P_x \\ P_y \\ P_z \end{bmatrix} - A^T \cdot \begin{bmatrix} 0 \\ 0 \\ \rho \end{bmatrix} = \mu \begin{bmatrix} u_x \\ u_y \\ u_z \end{bmatrix} \quad \text{[Equation 5]}$$

If Equation 5 is simplified, the following Equation is obtained.

$$\begin{bmatrix} r_{11} & r_{12} & r_{13} \\ r_{21} & r_{22} & r_{23} \\ r_{31} & r_{32} & r_{33} \end{bmatrix} \begin{bmatrix} P_x \\ P_y \\ P_z \end{bmatrix} - \begin{bmatrix} a_{11} & a_{12} & a_{13} \\ a_{21} & a_{22} & a_{23} \\ a_{31} & a_{32} & a_{33} \end{bmatrix} \begin{bmatrix} 0 \\ 0 \\ \rho \end{bmatrix} = \mu \begin{bmatrix} \tan(\Psi_x) \\ \tan(\Psi_y) \\ -1 \end{bmatrix} \quad \text{[Equation 6]}$$

In this case, $\alpha$ is the element of the rotation matrix A, r is the element of a matrix $R=(M \cdot A)^T$, and $\psi_x$ and $\psi_y$ are photographing angles in x and y directions.

If the parameter $\mu$ is eliminated from Equation 6, two equations, which are sensor models defined by the photographing angles, are realized, as shown in the following Equations.

$$F_1 = \tan^{-1}\left[\frac{r_{11}p_x + r_{12}p_y + r_{13}p_z - a_{31}\rho}{r_{31}p_x + r_{32}p_y + r_{33}p_z - a_{33}\rho}\right] + \Psi_x = 0 \quad \text{[Equation 7]}$$

$$F_2 = \tan^{-1}\left[\frac{r_{21}p_x + r_{22}p_y + r_{23}p_z - a_{32}\rho}{r_{31}p_x + r_{32}p_y + r_{33}p_z - a_{33}\rho}\right] + \Psi_x = 0 \quad \text{[Equation 8]}$$

$$\tan^{-1}\left[\frac{r_{11}p_x + r_{12}p_y + r_{13}p_z - a_{31}\rho}{r_{31}p_x + r_{32}p_y + r_{33}p_z - a_{33}\rho}\right] \text{ and}$$

In this case, $$\tan^{-1}\left[\frac{r_{21}p_x + r_{22}p_y + r_{23}p_z - a_{32}\rho}{r_{31}p_x + r_{32}p_y + r_{33}p_z - a_{33}\rho}\right]$$

are the photographing angles of the sensor, obtained using the position, velocity and attitude of the photographing device among the auxiliary data.

The sensor models of the present invention represented by Equations 7 and 8 are sensor models having a new format, differing from conventional sensor models (collinearity equations, sensor models disclosed in Korean Patent Appln. No. 10-2005-51358, etc.).

For reference, $\alpha$ and r in the sensor models are functions of the time t for which an image is taken, the photographing time t is proportional to the number of lines i, and $\psi_x$ and $\psi_y$ are functions of the number of columns j. Therefore, the sensor models represent the relationship between the image coordinates (i, j) and the ground coordinates ($P_x$, $P_y$, $P_z$).

If precise ground coordinates and precise image coordinates at any one point are applied to Equations 7 and 8 when there is no distortion in an image, $F_1=F_2=0$ will be satisfied. However, due to distortion, $F_1$ and $F_2$ have a value other than 0, which indicates the amount of distortion of the image. The units in Equations 7 and 8 are angles (degrees). Therefore, the amount of distortion is also represented by degrees, but it is difficult to determine the amount of distortion using degrees. Therefore, it is preferable that a scale factor k be multiplied by the results of Equations 7 and 8 ($k^{F1}$ and $k^{F2}$) to convert such degrees into distances. The scale factor is defined by $k=h/\cos(\psi_c)$ using the height of a satellite h, and the photographing angle $\psi_c$ at the center of the image.

As described above, since the auxiliary data for the image is not accurate, considerable errors may occur if the ground coordinates ($P_x$, $P_y$, $P_z$) are assigned to respective image coordinates (i, j) using the sensor models. Therefore, an element required to offset such errors must be added to the sensor models.

The LOS vector adjustment models, in which the element required to offset the errors is additionally provided, are given by the following two equations.

$$F_1 = \tan^{-1}\left[\frac{r_{11}p_x + r_{12}p_y + r_{13}p_z - a_{31}\rho}{r_{31}p_x + r_{32}p_y + r_{33}p_z - a_{33}\rho}\right] + \Psi_x + E_x = 0 \quad \text{[Equation 9]}$$

$$F_2 = \tan^{-1}\left[\frac{r_{21}p_x + r_{22}p_y + r_{23}p_z - a_{32}\rho}{r_{31}p_x + r_{32}p_y + r_{33}p_z - a_{33}\rho}\right] + \Psi_y + E_y = 0 \quad \text{[Equation 10]}$$

In this case, $E_x$ and $E_y$ are error correction data, and are values required to offset errors, which are included in the photographing angles of the sensor of the photographing device that are auxiliary data and which exist in x and y directions.

The error correction data can be determined by the number of lines i of the image and the number of columns j, and can be represented by the following Equations.

$$E_x = a_{x0} + \sum_{m=0}^{n}(b_{xm} \cdot i^{m+1} + c_{xm} \cdot j^{m+1}) \quad \text{[Equation 11]}$$

$$E_y = a_{y0} + \sum_{m=0}^{n}(b_{ym} \cdot i^{m+1} + c_{ym} \cdot j^{m+1}) \quad \text{[Equation 12]}$$

In this case $a_{x0}$, $b_{xm}$, $c_{xm}$, $a_{y0}$, $b_{ym}$ and $c_{ym}$ are the coefficients of the LOS vector corrected by the ground control point.

Figure 3:
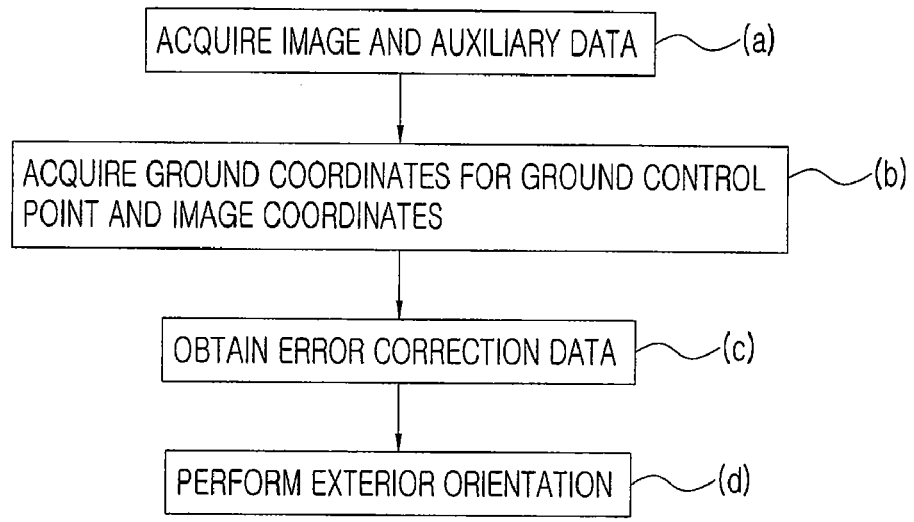
FIG. 3 is a flowchart of a geometric correction method according to the present invention.

Hereinafter, a method of correcting the geometry of an image through the adjustment of a LOS vector according to the present invention is described with reference to the flowchart of FIG. 3.

First, at step (a), an image, obtained by photographing a ground surface, and auxiliary data for the image are acquired.

The image and the auxiliary data are obtained by a photographing device, such as an airplane or a satellite. In this case, the auxiliary data includes position information about a photographing device for photographing the image, velocity information about the photographing device, the time required to photograph the central line of the image, the photographing time per line of the image, attitude information about the photographing device (yaw, pitch and roll), and information about the photographing angles in X and Y directions and the distortion of a lens.

After step (a) has been performed, at step (b), a ground control point is selected, and ground coordinates $(P_x, P_y, P_z)$ at the ground control point, and the image coordinates $(i, j)$ of the image, matching the ground coordinates, are acquired.

The selection of the ground control point is preferably performed to select a bridge, a building, etc., so that the ground control point can be easily identified in the image. The ground coordinates for the ground control point are acquired by Global Positioning System (GPS) measurement in a field, or are obtained using digital terrain data. The image coordinates matching the ground coordinates are directly acquired by an operator viewing the image.

In this case, it is preferable that that the sensor models of Equations 7 and 8 be used for acquiring the image coordinates matching the ground coordinates. Since the image includes a considerably wide region, it is not easy for an operator to detect image coordinates corresponding to the ground control point in the image without any information. Therefore, if the ground coordinates for the ground control point are applied to the sensor models to obtain image coordinates through the sensor models, and the surroundings of the image coordinates, obtained through the sensor models, in the image are searched, the image coordinates matching the ground coordinates can be easily obtained.

After step (b) has been performed, at step (c), the LOS vector of the sensor of the photographing device for photographing the image is adjusted using the auxiliary data, the ground coordinates and the image coordinates, thus acquiring error correction data $E_x$ and $E_y$.

This operation is described in detail. If the ground coordinates for the ground control point, the image coordinates, and the auxiliary data for the image are applied to Equations 9 and 10, $E_x$ and $E_y$ are unknown quantities. Since the unknown quantities $E_x$ and $E_y$ are functions of the image coordinates (i, j), as indicated in Equations 11 and 12, $a_{x0}$, $b_{xm}$, $c_{xm}$, $a_{y0}$, $b_{ym}$ and $c_{ym}$, which are the coefficients of the LOS vector, are unknown quantities. Consequently, if the coefficients of the LOS vector are determined, error correction data is obtained.

If the number of ground control points is one, $E_x$ and $E_y$ are calculated up to 0-th order terms of i and j (that is, $a_{x0}$ and $a_{y0}$). If the number of ground control points is two, $E_x$ and $E_y$ are calculated up to first order terms of i and j (that is, $a_{x0}$, $b_{xm}$, $c_{xm}$, $a_{y0}$, $b_{ym}$ and $c_{ym}$). If the number of ground control points is n, $E_x$ and $E_y$ are calculated up to n-i-th order terms of i and j. Accordingly, $E_x$ and $E_y$ are obtained.

In this case, $E_x$ and $E_y$ are preferably calculated up to the first order terms of i and j (that is, when the number of ground control points is two). As a result of experiments, if calculation is performed up to 0-th order terms, a lot of errors occur, whereas, if calculation is performed up to second or higher order terms, the calculation procedure is complicated, and over-correction errors occur.

As described above, error correction data $E_x$ and $E_y$ are obtained using Equations 9, 10, 11 and 12, and the coefficients thereof are obtained using normal equations generally used in engineering fields. A calculation procedure using normal equations is well known in the art, so a detailed description thereof is omitted.

After step (c) has been performed, at step (d), exterior orientation for correcting the distortion of the image is performed by applying the auxiliary data for the image and the error correction data to LOS vector adjustment models, and by assigning ground coordinates to respective image coordinates of the image.

The auxiliary data, the error correction data and the image coordinates are applied to Equations 9 and 10, and thus the ground coordinates $(P_x, P_y, P_z)$ are obtained. The number of equations is two, and the number of unknown quantities is three. Therefore, it is impossible to calculate ground coordinates using only a single image, obtained by photographing the ground surface, and thus another image, obtained by photographing the same ground surface, is additionally required. Then, since two equations are obtained from the first image, and two equations are obtained from the second image, the ground coordinates can be calculated.

After step (d) has been performed in this way, the image is provided with information about the ground coordinates. Therefore, it is possible to produce a three-dimensional image on the basis of the information, to produce an orthoimage through the rearrangement of the locations of pixels, and to produce a digital topographic map, digital terrain data, etc.

Further, for reference, if the attitude of the photographing device is adjusted, results similar to those obtained when the photographing angle of the sensor is adjusted can be obtained from an external point of view. However, when the attitude of the photographing device is adjusted, the calculation procedure thereof is considerably complicated, thus increasing the time required to extract ground coordinates. Further, it is difficult to effectively correct errors, occurring in the direction of pixels (j or x direction), through the use of a function of time t, that is, a function of the direction of lines (i or y direction).

Hereinafter, an apparatus for correcting the geometry of an image through the adjustment of a LOS vector according to the present invention is described with reference to FIG. 4, which shows a block diagram.

It is impossible in practice to perform the correction of geometry of an image through a manual operation. Therefore, geometry is corrected using a device such as a computer. The geometric correction apparatus according to the present invention is required for such an operation.

Figure 4:
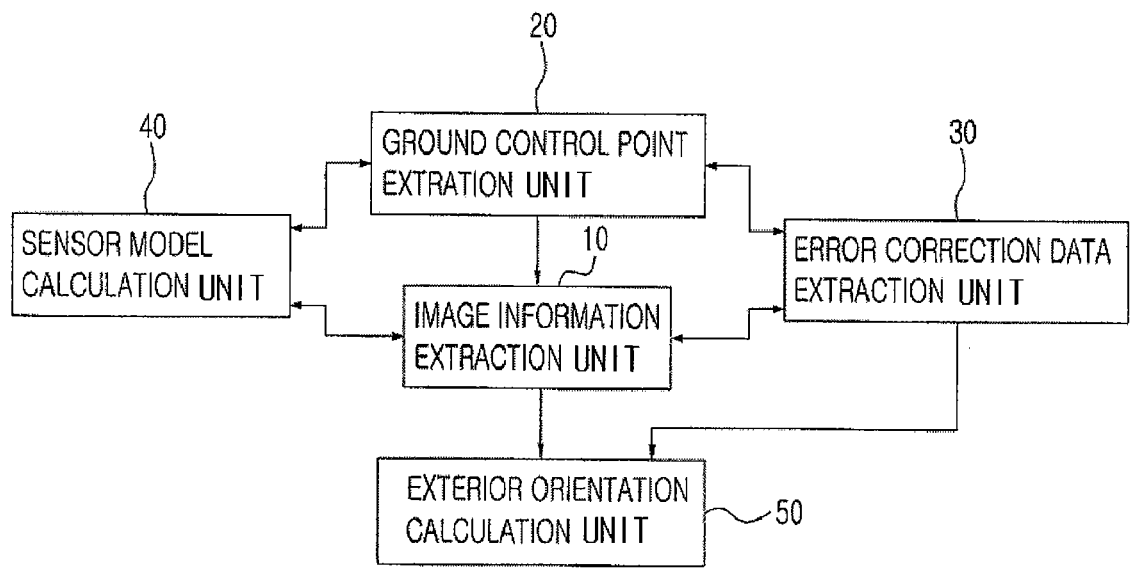
FIG. 4 is a schematic block diagram of a geometric correction apparatus according to the present invention.

As shown in FIG. 4, the geometric correction apparatus according to the present invention includes an image information extraction unit 10, a ground control point extraction unit 20, an error correction data extraction unit 30, an exterior orientation calculation unit 50, and a sensor model calculation unit 40.

The image information extraction unit 10 extracts the position, velocity and attitude of a photographing device, and a LOS vector of the sensor of the photographing device, which are information required to correct geometric distortion, from auxiliary data for an input image.

The ground control point extraction unit 20 receives and stores ground coordinates and image coordinates for a plurality of ground control points. The ground coordinates and the image coordinates are input by an operator.

The sensor model calculation unit 40 is required to allow the operator to easily detect image coordinates which match ground coordinates. The image coordinates are detected by the operator viewing the image. It is not easy to detect any one point corresponding to a ground control point in the image obtained by photographing a wide region. Therefore, the sensor model calculation unit 40 receives data from the image information extraction unit and ground coordinates from the ground control point extraction unit, and calculates the data and the ground coordinates, thus obtaining image coordinates. The image coordinates based on sensor models may contain errors, but approach precise image coordinates. Therefore, the operator searches the surroundings of the image coordinates of the image, calculated based on the sensor models, thus easily detecting precise image coordinates.

The error information extraction unit 30 receives data from the image information extraction unit 10 and the ground control point extraction unit 20, and then generates error correction data $E_x$ and $E_y$ through the adjustment of the LOS vector of the sensor of the photographing device.

The exterior orientation calculation unit 50 receives data from the image information extraction unit 10 and the error correction data extraction unit 30, applies the received data to the above Equations 9 and 10, which are LOS vector adjustment models, and then calculates ground coordinates corresponding to respective image coordinates of the image.

Although the method and apparatus for correcting the geometry of an image through LOS vector adjustment, having specific steps and components, have been described with reference to the attached drawings in the course of description of the present invention, those skilled in the art will appreciate that various modifications, additions and substitutions are possible. The modifications, additions and substitutions should be interpreted as being included in the scope of the present invention.

The invention claimed is:

1. A method for correcting geometry of an image using a Line-Of-Sight (LOS) vector adjustment model, the method comprising:
    acquiring an image and auxiliary data for the image, the image obtained by photographing a ground surface;
    acquiring ground coordinates for a ground control point and image coordinates of the image matching the ground coordinates;
    adjusting a LOS vector of a sensor of a photographing device used to photograph for photographing the image using the auxiliary data acquired; and
    adjusting the ground coordinates and the image coordinates acquired, thus obtaining error correction data; and
    applying the acquired auxiliary data and the obtained error correction data obtained to LOS vector adjustment models, and assigning ground coordinates to corresponding image coordinates of the image, thus performing exterior orientation for correcting distortion of the image,
    wherein acquiring image coordinates matching the ground coordinates is performed using image coordinates based on sensor models that are obtained using sensor models represented by the following Equations 7 and 8:

$$F_1 = \tan^{-1}\left[\frac{r_{11}p_x + r_{12}p_y + r_{13}p_z - a_{31}\rho}{r_{31}p_x + r_{32}p_y + r_{33}p_z - a_{33}\rho}\right] + \Psi_x = 0 \quad \text{[Equation 7]}$$

$$F_2 = \tan^{-1}\left[\frac{r_{21}p_x + r_{22}p_y + r_{23}p_z - a_{32}\rho}{r_{31}p_x + r_{32}p_y + r_{33}p_z - a_{33}\rho}\right] + \Psi_y = 0 \quad \text{[Equation 8]}$$

where ($P_x$, $P_y$, $P_z$) are ground coordinates for the ground control point, $\rho$ is the distance from the center of the earth to the photographing device, and $$\tan^{-1}\left[\frac{r_{11}p_x + r_{12}p_y + r_{13}p_z - a_{31}\rho}{r_{31}p_x + r_{32}p_y + r_{33}p_z - a_{33}\rho}\right]$$

and $\tan^{-1}\left[\frac{r_{21}p_x + r_{22}p_y + r_{23}p_z - a_{32}\rho}{r_{31}p_x + r_{32}p_y + r_{33}p_z - a_{33}\rho}\right]$ are photographing angles of the sensor among the auxiliary data, and $\psi_x$ and $\psi_y$ are photographing angles of the sensor, obtained using a position, velocity and attitude of the photographing device, among the auxiliary data, $F_1$ and $F_2$ are residual errors due to distortion of image, $r_{11}$ to $r_{33}$ are the elements of $R=(M \cdot A)^T$, the position coordinate rotation matrix (M) and the attitude coordination rotation matrix (A) follow $$M^{-1} \cdot \begin{bmatrix} P_x \\ P_y \\ P_z \end{bmatrix} \cdot \begin{bmatrix} 0 \\ 0 \\ \rho \end{bmatrix} = \mu A \cdot \begin{bmatrix} u_x \\ u_y \\ u_z \end{bmatrix}, u_x, u_y, u_z$$

are the elements of the LOS vector ($\vec{u}$) and $\mu$ is the parameter related with $\vec{u}$ and $\vec{P}$ and $E_x$ and $E_y$ are error correction data in x and y directions.

2. The method according to claim 1, wherein the LOS vector adjustment models are represented by the following Equations 9 and 10:

$$F_1 = \tan^{-1}\left[\frac{r_{11}p_x + r_{12}p_y + r_{13}p_z - a_{31}\rho}{r_{31}p_x + r_{32}p_y + r_{33}p_z - a_{33}\rho}\right] + \Psi_x + E_x = 0 \quad \text{[Equation 9]}$$

$$F_2 = \tan^{-1}\left[\frac{r_{21}p_x + r_{22}p_y + r_{23}p_z - a_{32}\rho}{r_{31}p_x + r_{32}p_y + r_{33}p_z - a_{33}\rho}\right] + \Psi_y + E_y = 0 \quad \text{[Equation 10]}$$

where $E_x$ and $E_y$ are error correction data in x and y directions.

3. The method according to claim 2, wherein the error correction data is obtained using the following Equations 11 and 12:

$$E_x = a_{x0} + \sum_{m=0}^{n}(b_{xm} \cdot i^{m+1} + c_{xm} \cdot j^{m+1}) \quad \text{[Equation 11]}$$

$$E_y = a_{y0} + \sum_{m=0}^{n}(b_{ym} \cdot i^{m+1} + c_{ym} \cdot j^{m+1}) \quad \text{[Equation 12]}$$

where $a_{x0}$, $b_{xm}$, $c_{xm}$, $a_{y0}$, $b_{ym}$ and $c_{ym}$ are coefficients of the LOS vector corrected by the ground control point, i is a line of the image, and j is a column of the image.

4. The method according to claim 3, wherein the error correction data is a value calculated up to first order terms of i and j.

5. An apparatus for correcting geometry of an image using a LOS vector adjustment model, the apparatus comprising:
    an image information extraction unit configured to acquire an image and auxiliary data for the image, the image being obtained by photographing a ground surface;

a ground control point extraction unit configured to receive and store ground coordinates for a ground control point and image coordinates matching the ground coordinates;

an error correction data extraction unit configured to receive the auxiliary data from the image information extraction unit and the ground coordinates and the image coordinates from the ground control point extraction unit, and then generate error correction data through adjustment of a LOS vector of the sensor of a photographing device for photographing the image; and an exterior orientation calculation unit configured to receive the auxiliary data from the image information extraction unit and the error correction data from the error correction data extraction unit and apply the data to LOS vector adjustment models, thus calculating ground coordinates corresponding to respective image coordinates of the image, wherein the LOS vector adjustment models used for the exterior orientation calculation unit are represented by the following Equations 9 and 10:

$$F_1 = \tan^{-1}\left[\frac{r_{11}p_x + r_{12}p_y + r_{13}p_z - a_{31}\rho}{r_{31}p_x + r_{32}p_y + r_{33}p_z - a_{33}\rho}\right] + \Psi_x + E_x = 0 \quad \text{[Equation 9]}$$

$$F_2 = \tan^{-1}\left[\frac{r_{21}p_x + r_{22}p_y + r_{23}p_z - a_{32}\rho}{r_{31}p_x + r_{32}p_y + r_{33}p_z - a_{33}\rho}\right] + \Psi_y + E_y = 0 \quad \text{[Equation 10]}$$

where $(P_x, P_y, P_z)$ are ground coordinates for the ground control point, $\rho$ is the distance from the center of the earth to the photographing device, and are photographing angles of the sensor among the auxiliary data, and $\Psi_x$ and $\Psi_y$ are photographing angles of the sensor, obtained using a position, velocity and attitude of the photographing device, among the auxiliary data, $F_1$ and $F_2$ are residual errors due to distortion of image, $r_{11}$ to $r_{33}$ are the elements of $R=(M\cdot A)^T$, the position coordinate rotation matrix (M) and the attitude coordination rotation matrix (A) follow $$M^{-1} \cdot \begin{bmatrix} P_x \\ P_y \\ P_z \end{bmatrix} \cdot \begin{bmatrix} 0 \\ 0 \\ \rho \end{bmatrix} = \mu A \cdot \begin{bmatrix} u_x \\ u_y \\ u_z \end{bmatrix}, u_x, u_y, u_z$$

are the elements of the LOS vector ($\vec{u}$) and $\mu$ is the parameter related with $\vec{u}$ and $\vec{P}$, and $E_x$ and $E_y$ are error correction data in x and y directions.

6. The apparatus according to claim 5, further comprising a sensor model calculation unit configured to detect image coordinates matching the ground coordinates, and receive data from the image information extraction unit and the ground coordinates from the ground control point extraction unit, thus calculating image coordinates based on sensor models.

* * * * *